(12) United States Patent
Kim et al.

(10) Patent No.: US 12,446,765 B2
(45) Date of Patent: Oct. 21, 2025

(54) ARTIFICIAL INTELLIGENCE-BASED GASTROSCOPIC IMAGE ANALYSIS METHOD

(71) Applicants: WAYCEN INC., Seoul (KR); INDUSTRY-ACADEMIC COOPERATION FOUNDATION, YONSEI UNIVERSITY, Seoul (KR)

(72) Inventors: Kyung Nam Kim, Suwon-si (KR); Jie-Hyun Kim, Seoul (KR)

(73) Assignees: WAYCEN INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 534 days.

(21) Appl. No.: 18/020,232

(22) PCT Filed: Aug. 4, 2021

(86) PCT No.: PCT/KR2021/010186
§ 371 (c)(1),
(2) Date: Feb. 7, 2023

(87) PCT Pub. No.: WO2022/035119
PCT Pub. Date: Feb. 17, 2022

(65) Prior Publication Data
US 2023/0301503 A1   Sep. 28, 2023

(30) Foreign Application Priority Data

Aug. 10, 2020   (KR) .................. 10-2020-0100030

(51) Int. Cl.
*A61B 1/273*      (2006.01)
*G06T 7/00*       (2017.01)
(Continued)

(52) U.S. Cl.
CPC .......... *A61B 1/2736* (2013.01); *G06T 7/0012* (2013.01); *G16H 30/20* (2018.01);
(Continued)

(58) Field of Classification Search
None
See application file for complete search history.

(56) References Cited

U.S. PATENT DOCUMENTS

2019/0125173 A1*   5/2019   Lee .................. G06T 7/0012
2022/0031227 A1*   2/2022   Cho .................. G06V 10/82

FOREIGN PATENT DOCUMENTS

CN      108852268 A   * 11/2018   .......... A61B 1/2736
JP      2020-073081 A      5/2020
(Continued)

OTHER PUBLICATIONS

Almanifi, Omair Rashed Abdulwareth, et al. "Automated gastrointestinal tract classification via deep learning and the ensemble method." 2021 21st International Conference on Control, Automation and Systems (ICCAS). IEEE, 2021. (Year: 2021).*
(Continued)

*Primary Examiner* — Samah A Beg
(74) *Attorney, Agent, or Firm* — Stein IP LLC

(57) ABSTRACT

Disclosed is an artificial intelligence (AI)-based gastroscopic image analysis method including a step of configuring training data and training the plurality of image classification models, a step of observing or photographing respective parts of a stomach from the oral cavity and the laryngopharynx to the second part of the duodenum using a gastroscopic probe, a step of automatically classifying and recognizing the anatomical location of the stomach with respect to an image captured during photographing using the plurality of image classification models, automatically storing or reporting the location of a lesion, and a step of
(Continued)

segmenting an image of a specific part in the captured gastroscopic image for each region by a region segmentation model and outputting the same number of segmented maps as the number of target classes as the result of segmentation.

12 Claims, 9 Drawing Sheets

(51) Int. Cl.
    *G16H 30/20*     (2018.01)
    *G16H 30/40*     (2018.01)

(52) U.S. Cl.
    CPC ............... *G06T 2207/10068* (2013.01); *G06T 2207/20084* (2013.01); *G16H 30/40* (2018.01)

(56) References Cited

FOREIGN PATENT DOCUMENTS

| | | |
|---|---|---|
| JP | 2020-078539 A | 5/2020 |
| KR | 10-2019-0046530 A | 5/2019 |
| KR | 10-2019-0103937 A | 9/2019 |
| KR | 10-2019-0117187 A | 10/2019 |
| KR | 10-2020-0038120 A | 4/2020 |
| KR | 10-2255311 B1 | 5/2021 |

OTHER PUBLICATIONS

Chen, Honghan, et al. "Automatic content understanding with cascaded spatial-temporal deep framework for capsule endoscopy videos." Neurocomputing 229 (2017): 77-87. (Year: 2017).*

He, Qi, et al. "Deep learning-based anatomical site classification for upper gastrointestinal endoscopy." International journal of computer assisted radiology and surgery 15.7 (2020): 1085-1094. (Year: 2020).*

Mackiewicz, Michal, Jeff Berens, and Mark Fisher. "Wireless capsule endoscopy color video segmentation." IEEE Transactions on Medical Imaging 27.12 (2008): 1769-1781. (Year: 2008).*

Mesejo, Pablo, et al. "Computer-aided classification of gastrointestinal lesions in regular colonoscopy." IEEE transactions on medical imaging 35.9 (2016): 2051-2063. (Year: 2016).*

Lin, Ting-Hsuan, et al. "Deep ensemble feature network for gastric section classification." IEEE journal of biomedical and health informatics 25.1 (2020): 77-87. (Year: 2020).*

Öztürk, Şaban, and Umut Özkaya. "Gastrointestinal tract classification using improved LSTM based CNN." Multimedia Tools and Applications 79.39 (2020): 28825-28840. (Year: 2020).*

Internal Search Report mailed Nov. 11, 2021, issued to International Application No. PCT/KR2021/010186.

* cited by examiner

⟨PICTURE 1⟩

⟨PICTURE 4⟩

⟨PICTURE 7⟩

⟨PICTURE 2⟩

⟨PICTURE 5⟩

⟨PICTURE 8⟩

⟨PICTURE 3⟩

⟨PICTURE 6⟩

<BODY OF STOMACH>     <SEGMENTATION RESULT>

<ANTRUM OF STOMACH>     <SEGMENTATION RESULT>

<FUNDUS OF STOMACH>     <SEGMENTATION RESULT>

ARTIFICIAL INTELLIGENCE-BASED GASTROSCOPIC IMAGE ANALYSIS METHOD

CROSS-REFERENCE TO RELATED APPLICATIONS

This application is a national stage of International Application No. PCT/KR2021/010186, filed Aug. 4, 2021, which claims the benefit of Korean Application No. 10-2020-0100030, filed Aug. 10, 2020, in the Korean Intellectual Property Office, the disclosures of which are incorporated herein by reference.

TECHNICAL FIELD

The present invention relates to an artificial intelligence-based gastroscopic image analysis method, and more particularly to an artificial intelligence (AI)-based gastroscopic image analysis method capable of inputting a gastroscopic image into an artificial intelligence (AI) training model, thereby automatically recognizing the anatomical location of a stomach in gastroscopy that is performed and recording and reporting the location of a lesion.

BACKGROUND ART

Cancer is a disease that disturbs the function of normal cells through limitless cell proliferation, and typical examples of cancer include gastric cancer, lung cancer, liver cancer, breast cancer, and colorectal cancer; however, cancer may occur in any tissue. Globally, gastric cancer occurs a lot in Korea, Japan, etc. but has a low occurrence frequency in Europe and America. In Korea, the incidence rate of gastric cancer is highest, and the death rate of gastric cancer is second highest, which follows the death rate of lung cancer. When looking at classification thereof, gastric cancer is adenocarcinoma, 95% of which occurs in glandular cells of the mucous membrane of the stomach wall. In addition, there are lymphoma occurring in a lymphatic system and gastrointestinal stromal tumor occurring in interstitial tissue.

Cancer diagnosis in the first stage was based on an external change of living tissue due to growth of cancer cells, but diagnosis and detection using a very small amount of biomolecules present in tissue or cells of a living thing, such as blood, glycol chain, and deoxyribonucleic acid, have been attempted in recent years. However, the most universal cancer diagnosis method is diagnosis using a tissue sample acquired through biopsy or an image.

Biopsy has shortcomings in that patients feel great pain, high expenses are incurred, and it takes a long time to complete diagnosis. In addition, when a patient actually gets cancer, there is a high danger of cancer spreading during biopsy, and for a part, from which a tissue sample cannot be acquired through biopsy, there is a shortcoming in that disease diagnosis is impossible before suspicious tissue is extracted through surgical operation.

In diagnosis using an image, cancer is determined based on an X-ray image or a nuclear magnetic resonance (NMR) image acquired using a contrast agent having a disease target material attached thereto. Such image diagnosis has shortcomings in that there is a possibility of misdiagnosis depending on the proficiency of a clinician or doctor and the image diagnosis greatly depends on precision of an image acquisition instrument.

Korean Patent Application Publication No. 10-2020-0038120 (Patent Document 1) discloses GASTRIC LESION DIAGNOSIS APPARATUS AND METHOD USING DEEP LEARNING OF GASTROSCOPIC IMAGE, wherein the gastric lesion diagnosis method, which is a method of diagnosing a gastric lesion in a gastroscopic image, includes a step of acquiring a plurality of gastric lesion images, a step of creating a data set in which the plurality of gastric lesion images is linked to patient information, a step of preprocessing the data set so as to be applicable to a deep learning algorithm, a step of constructing an artificial neural network through learning having the data set as input and an item regarding a gastric lesion classification result as output, and a step of preprocessing a new data set and performing gastric lesion diagnosis through the artificial neural network.

Patent Document 1 has an advantage in that it is possible to collect white-light gastroscopic images acquired by an endoscopic camera and to diagnose a gastric lesion by applying the images to the deep learning algorithm but has a problem in that the system and method are designed to be applied only to gastric lesion diagnosis, whereby it is not possible to diagnose lesions of parts (e.g. the oral cavity, the laryngopharynx, the esophagus, and the duodenum) adjacent to a target part (stomach).

DISCLOSURE

Technical Problem

The present invention has been made in view of the above problems, and it is an object of the present invention to provide an artificial intelligence (AI)-based gastroscopic image analysis method capable of inputting a gastroscopic image into an artificial intelligence (AI) training model and analyzing the input image thereby, thereby automatically recognizing the anatomical location of a stomach in gastroscopy that is performed and recording and reporting the location of a lesion with respect to a target part or a part adjacent thereto.

Technical Solution

In order to accomplish the above object, an artificial intelligence (AI)-based gastroscopic image analysis method according to the present invention, wherein a captured gastroscopic image is input to a computer and the gastroscopic image is analyzed by an artificial intelligence training model installed in the computer, the artificial intelligence (AI)-based gastroscopic image analysis method including:

a) configuring a plurality of artificial intelligence-based image classification models for the captured gastroscopic image;

b) configuring training data for each of the plurality of image classification models and training the plurality of image classification models;

c) observing or photographing respective parts of a stomach from the oral cavity and the laryngopharynx to the second part of the duodenum or from the second part of the duodenum to the oral cavity and the laryngopharynx using a gastroscopic probe;

d) automatically classifying and recognizing the anatomical location of the stomach with respect to an image captured during photographing using the plurality of image classification models, automatically storing or reporting the location of a lesion, and verifying whether parts, images of which are recommended to be captured and stored, in gastroscopy have been photographed; and e) segmenting an image of a specific part in the captured gastroscopic image for each region by a region segmentation model and outputting the same number of segmented maps as the number of target classes as the result of segmentation.

Here, when the plurality of image classification models is configured in step a), the image classification models may be configured so as to be classified into parts adjacent to target parts, and the image classification models may be configured so as to be classified into a first classification model to a tenth classification model.

In addition, the training data may be configured for each of the plurality of image classification models in step b), and the training data may be configured so as to be classified into parts adjacent to each of the target parts in the captured gastroscopic image.

At this time, the first classification model may be configured such that the target part is the oral cavity/the laryngopharynx and parts adjacent thereto are the esophagus and the esophagogastric junction, and the second classification model may be configured such that the target part is the esophagus and parts adjacent thereto are the oral cavity and the esophagogastric junction.

In addition, the third classification model may be configured such that the target part is the esophagogastric junction and parts adjacent thereto are the esophagus and the body of the stomach, and the fourth classification model may be configured such that the target part is the body of the stomach and parts adjacent thereto are the cardia of the stomach, the fundus of the stomach, and the antrum of the stomach.

In addition, the fifth classification model may be configured such that the target part is the antrum of the stomach and parts adjacent thereto are the cardia of the stomach, the fundus of the stomach, and the body of the stomach, and the sixth classification model may be configured such that the target part is the fundus of the stomach and parts adjacent thereto are the cardia of the stomach, the body of the stomach, and the antrum of the stomach.

In addition, the seventh classification model may be configured such that the target part is the cardia of the stomach and parts adjacent thereto are the fundus of the stomach, the body of the stomach, and the antrum of the stomach, and the eighth classification model may be configured such that the target part is the angle of the stomach and parts adjacent thereto are the cardia of the stomach, the fundus of the stomach, the body of the stomach, and the antrum of the stomach.

In addition, the ninth classification model may be configured such that the target part is the duodenal bulb and parts adjacent thereto are the second part of the duodenum and the antrum of the stomach, and the tenth classification model may be configured such that the target part is the second part of the duodenum and parts adjacent thereto are the duodenal bulb and the antrum of the stomach.

In addition, when the respective parts of the stomach from the second part of the duodenum to the oral cavity and the laryngopharynx are photographed in step c), photographing may be performed in the sequence of the second part of the duodenum→the duodenal bulb→the pyloric ring→the antrum of the stomach→the angle of the stomach→the body of the stomach→the fundus of the stomach→the cardia of the stomach→the esophagus→the oral cavity and the laryngopharynx.

In addition, when the anatomical location of the stomach is automatically classified and recognized with respect to the image captured during photographing using the plurality of image classification models and the location of the lesion is automatically stored in step d), the oral cavity/the laryngopharynx, the esophagus, and the esophagogastric junction may be classified and recognized using the first, second, and third classification models, the esophagogastric junction, the esophagus, and the body of the stomach may be classified and recognized using the second, third, and fourth classification models, the body of the stomach, the esophagogastric junction, and the antrum of the stomach may be classified and recognized using the third, fourth, and fifth classification models, the antrum of the stomach, the body of the stomach, the angle of the stomach, and the duodenal bulb may be classified and recognized using the fourth, fifth, eighth, and ninth classification models, and the duodenal bulb, the antrum of the stomach, and the second part of the duodenum may be classified and recognized using the fifth, ninth, and tenth classification models in order to automatically store the location of the lesion during the photographing process from the oral cavity and the laryngopharynx to the second part of the duodenum.

In addition, when the anatomical location of the stomach is automatically classified and recognized with respect to the image captured during photographing using the plurality of image classification models and the location of the lesion is automatically reported in step d), the second part of the duodenum, the duodenal bulb, and the antrum of the stomach may be classified and recognized using the fifth, ninth, and tenth classification models, the antrum of the stomach, the duodenal bulb, the angle of the stomach, and the body of the stomach may be classified and recognized using the fourth, fifth, eighth, and ninth classification models, the body of the stomach, the antrum of the stomach, the fundus of the stomach, the cardia of the stomach, and the esophagogastric junction may be classified and recognized using the third, fourth, fifth, sixth, and seventh classification models, the esophagogastric junction, the body of the stomach, and the esophagus may be classified and recognized using the second, third, and fourth classification models, and the esophagus, the esophagogastric junction, and the oral cavity/the laryngopharynx may be classified and recognized using the first, second, and third classification models in order to report the location of the lesion during the photographing process from the second part of the duodenum to the oral cavity and the laryngopharynx.

In addition, the parts, images of which are recommended to be captured and stored, in gastroscopy in step d) may include the esophagogastric junction, the angle of the stomach, the antrum of the stomach, and the duodenal bulb.

In addition, when the anatomical location of the stomach is automatically classified and recognized with respect to the image captured during photographing using the plurality of image classification models and the location of the lesion is automatically stored or reported in step d), a perforation or a lesion becoming a cause of the perforation in a pylorus of the stomach between the duodenum and the antrum of the stomach may be automatically analyzed and reported.

In addition, the image of the specific part in step e) may include images of the body of the stomach, the antrum of the stomach, and the fundus of the stomach.

At this time, each of the images of the body of the stomach, the antrum of the stomach, and the fundus of the stomach may be segmented for each region by the region segmentation model and may include an anterior wall, a posterior wall, a lesser curvature, and a greater curvature as the result of segmentation.

Advantageous Effects

As is apparent from the above description, the present invention has an advantage in that a gastroscopic image is input to the artificial intelligence (AI) training model and is analyzed by the artificial intelligence training model, whereby it is possible to automatically recognize the anatomical location of a stomach in gastroscopy that is performed and to record and report the location of a lesion with respect to a target part and a part adjacent thereto.

In addition, an inspector having little experience in gastroscopy is reported in advance of a situation that may be dangerous, whereby it is possible to secure safety of inspection.

BEST MODE

It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best way.

In the case in which a part "includes" a component, throughout this specification, this means that the part may not exclude another component but may further include another component unless otherwise mentioned. In addition, the term "unit," "part," "module," or "device" used in this specification signifies one unit that processes at least one function or operation, and may be realized by hardware, software, or a combination thereof.

Hereinafter, an embodiment of the present invention will be described in detail with reference to the accompanying drawings.

Figure 1:
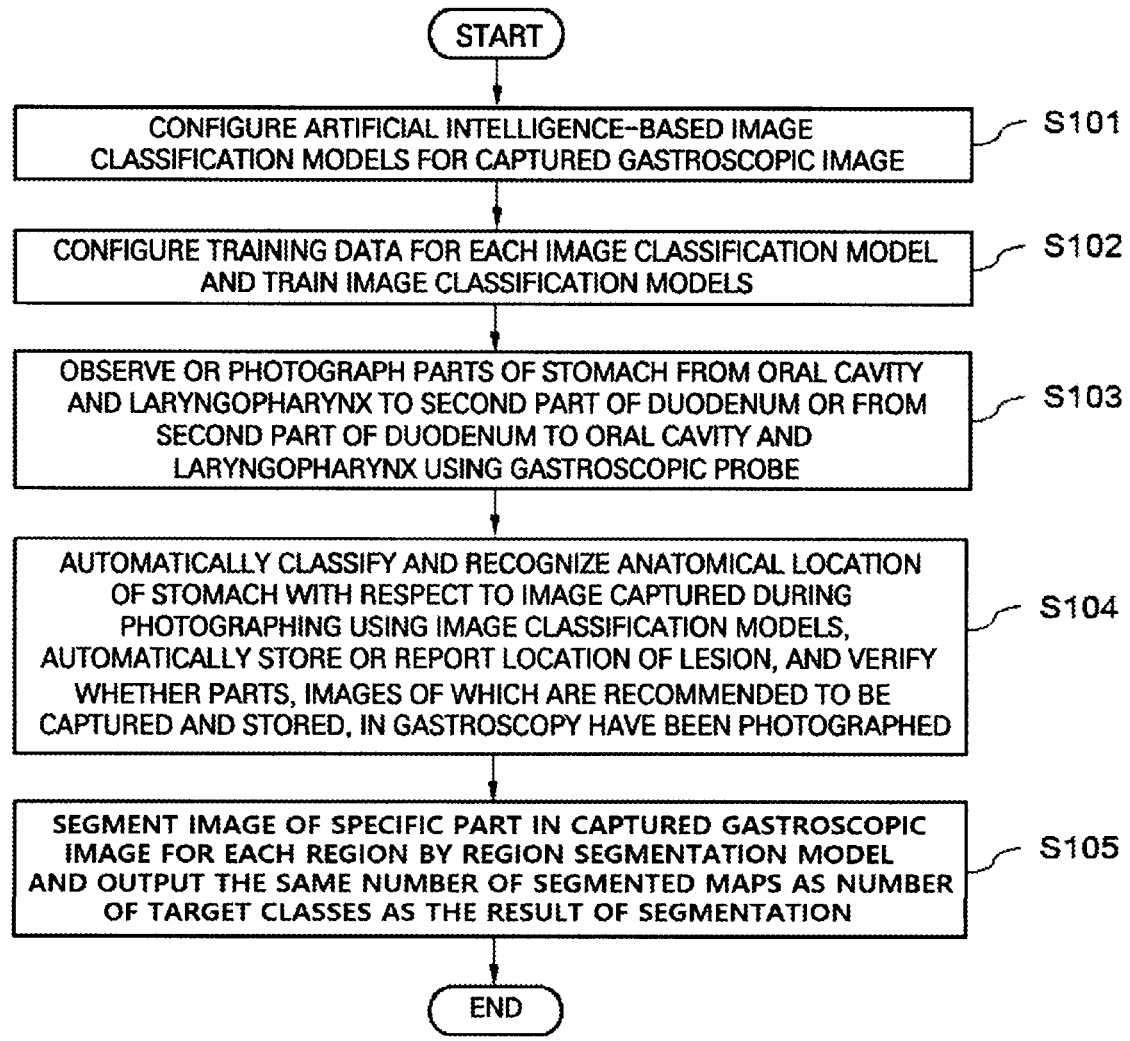
FIG. 1 is a flowchart showing execution processes of an artificial intelligence (AI)-based gastroscopic image analysis method according to the present invention.

FIG. 1 is a flowchart showing execution processes of an artificial intelligence (AI)-based gastroscopic image analysis method according to the present invention.

Referring to FIG. 1, in the artificial intelligence (AI)-based gastroscopic image analysis method according to the present invention, wherein a captured gastroscopic image is input to a computer and the gastroscopic image is analyzed by an artificial intelligence training model installed in the computer, a plurality of artificial intelligence-based image classification models is configured for the captured gastroscopic image first (step S101).

Subsequently, training data are configured for each of the plurality of image classification models and the plurality of image classification models is trained (step S102).

Figure 2:
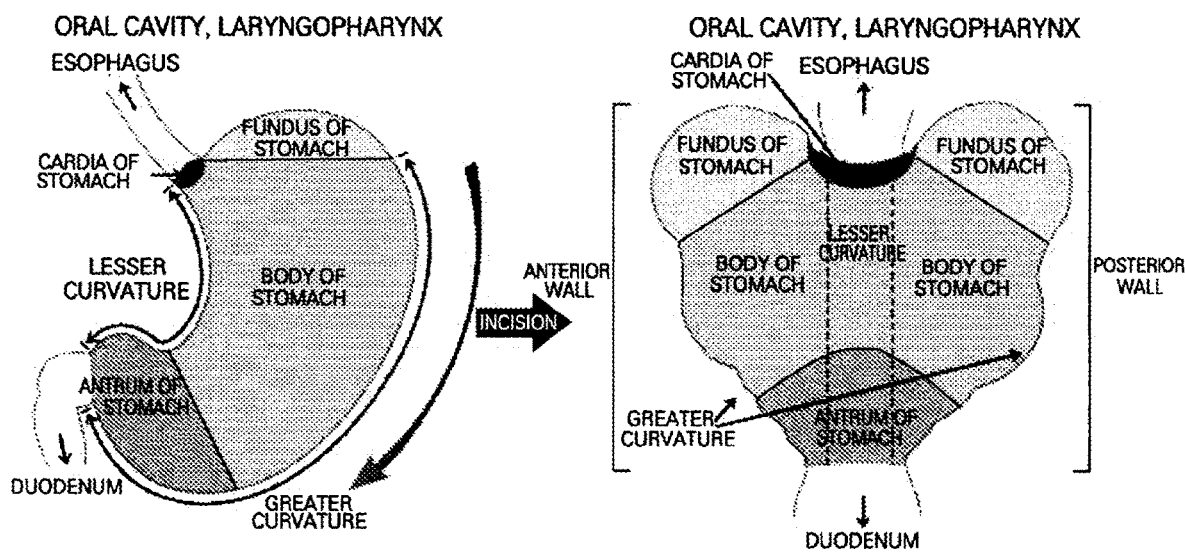
FIG. 2 is a view showing an anatomical structure of a stomach.
Figure 3:
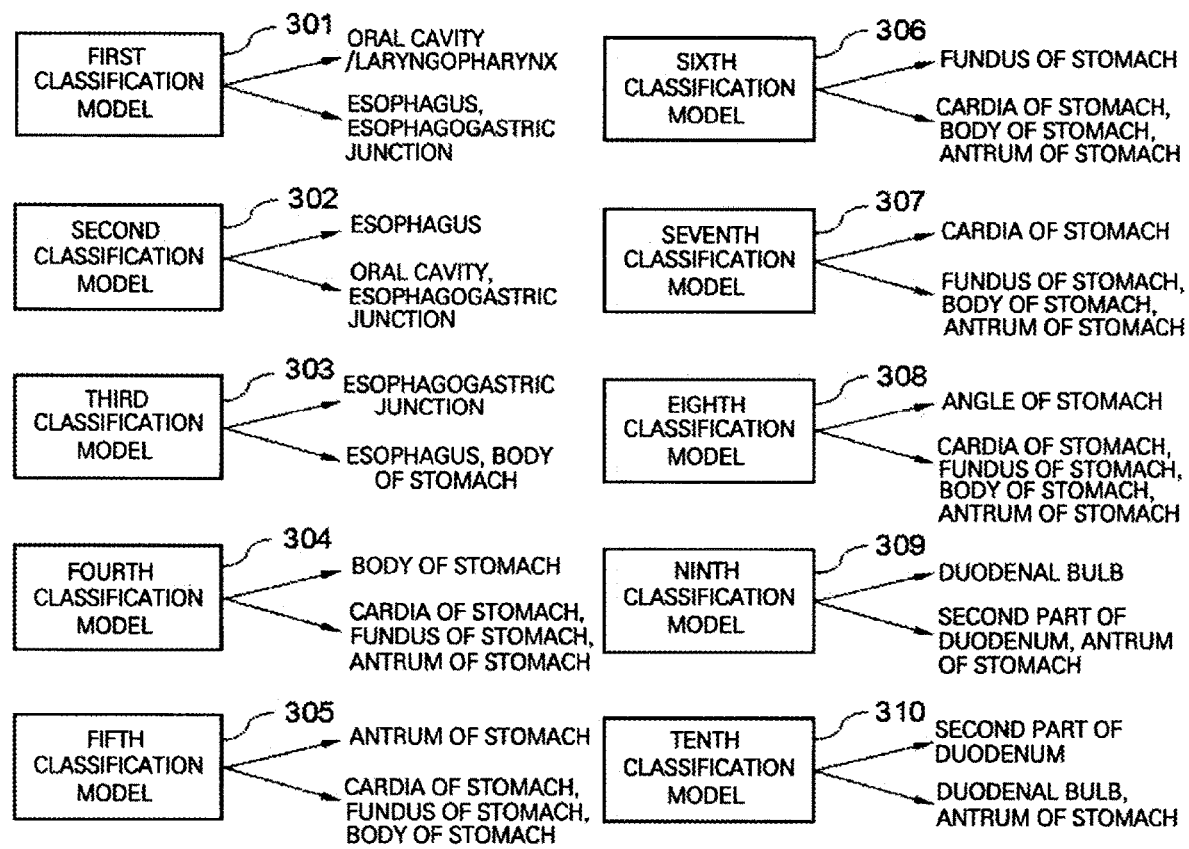
FIG. 3 is a view showing configuration of training data of image classification models.

Here, when the plurality of image classification models is configured in step S101, the image classification models may be configured so as to be classified into parts adjacent to target parts, and the image classification models may be configured so as to be classified into a first classification model to a tenth classification model, as shown in FIGS. 2 and 3.

In addition, the training data may be configured for each of the plurality of image classification models in step S102, and the training data may be configured so as to be classified into parts adjacent to each of the target parts in the captured gastroscopic image, as shown in FIG. 3.

At this time, the first classification model 301 may be configured such that the target part is the oral cavity/laryngopharynx and the parts adjacent thereto are the esophagus and the esophagogastric junction, and the second classification model 302 may be configured such that the target part is the esophagus and the parts adjacent thereto are the oral cavity and the esophagogastric junction.

In addition, the third classification model 303 may be configured such that the target part is the esophagogastric junction and the parts adjacent thereto are the esophagus and the body of the stomach, and the fourth classification model 304 may be configured such that the target part is the body of the stomach and the parts adjacent thereto are the cardia of the stomach, the fundus of the stomach, and the antrum of the stomach.

In addition, the fifth classification model 305 may be configured such that the target part is the antrum of the stomach and the parts adjacent thereto are the cardia of the stomach, the fundus of the stomach, and the body of the stomach, and the sixth classification model 306 may be configured such that the target part is the fundus of the stomach and the parts adjacent thereto are the cardia of the stomach, the body of the stomach, and the antrum of the stomach.

In addition, the seventh classification model 307 may be configured such that the target part is the cardia of the stomach and the parts adjacent thereto are the fundus of the stomach, the body of the stomach, and the antrum of the stomach, and the eighth classification model 308 may be configured such that the target part is the angle of the stomach and the parts adjacent thereto are the cardia of the stomach, the fundus of the stomach, the body of the stomach, and the antrum of the stomach.

In addition, the ninth classification model 309 may be configured such that the target part is the duodenal bulb and the parts adjacent thereto are the second part of the duodenum and the antrum of the stomach, and the tenth classification model 310 may be configured such that the target part is the second part of the duodenum and the parts adjacent thereto are the duodenal bulb and the antrum of the stomach.

Figure 4:
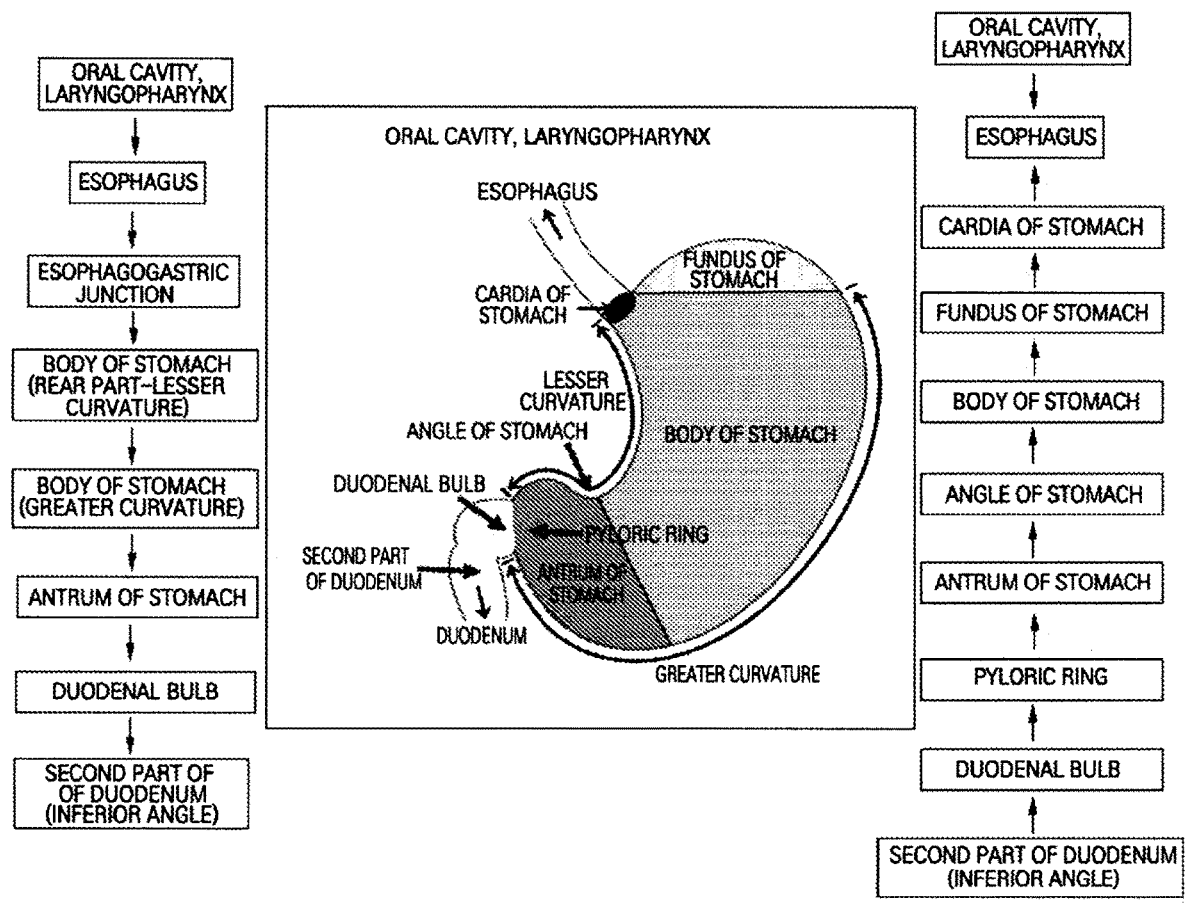
FIG. 4 is a view showing the movement routes of a probe during gastroscopy.

When configuration of the plurality of image classification models and training of the plurality of image classification models are completed, as described above, respective parts of the stomach from the oral cavity and the laryngopharynx to the second part of the duodenum or from the second part of the duodenum to the oral cavity and the laryngopharynx are observed or photographed using a gastroscopic probe, as shown in FIG. 4 (step S103). At this time, when the respective parts of the stomach from the second part of the duodenum to the oral cavity and the laryngopharynx are photographed, photographing may be performed in the sequence of the second part of the duodenum→the duodenal bulb→the pyloric ring→the antrum of the stomach→the angle of the stomach→the body of the stomach→the fundus of the stomach→the cardia of the stomach→the esophagus→the oral cavity and the laryngopharynx.

The photographing process from the oral cavity and the laryngopharynx to the second part of the duodenum or from the second part of the duodenum to the oral cavity and the laryngopharynx using the gastroscopic probe, as described above, will be further described.

When the gastroscopic probe reaches the entrance part of the esophagus, the entrance part is normally closed, and a mucous membrane is seen while the gastroscopic probe passes through the center of the entrance part. The esophagogastric junction is distant by 38 to 40 cm from the incisor, almost coincides with the boundary between the squamous epithelium of the esophagus and the columnar epithelium of the stomach, and may be observed as an irregular line, whereby the esophagogastric junction is called the "Z-line." The location of the diaphragm is seen as a pressed mark at the esophagogastric junction or immediately under the esophagogastric junction, and the gastric mucosa is observed up to 1 cm upwards from the diaphragm for a normal person. When the gastroscopic probe is smoothly pushed through the esophagogastric junction while an inspector directly looks at the esophagogastric junction, the gastroscopic probe easily passes through the esophagogastric junction. An endoscope is manufactured so as to be curved toward a posterior wall of the lesser curvature due to the structure of the lower esophagus. When the endoscope is pushed in the same way as before, therefore, the endoscope comes into contact with the posterior wall of the lesser curvature. When the endoscope passes through the cardia of the stomach, the endoscope is rotated in the left (in a counterclockwise direction), and observation is made while the endoscope is slightly pulled back and air is supplied. There are two important rules when the endoscope passes through this part; one is "do not enter if you cannot see" and the other is "pull back if in doubt."

In many cases, it is difficult for beginners to enter from the cardia to the body of the stomach via the esophagogastric junction. When the injection amount of air is reduced if possible and the inspector inserts the endoscope while looking at the leg of an examinee, not facing the examinee, easy entry is achieved. When entering the stomach, the watershed by which the fundus and the body of the stomach are segmented is seen at the right. An appropriate amount of air is injected to expand the body of the stomach. If an excessive amount of air is injected, air is suctioned, whereby entry into the body of the stomach is easy. When moving along the greater curvature of the body of the stomach forwards and rightwards under the watershed, the endoscope reaches the antrum of the stomach. When mucus or air bubbles are present on the gastric mucosa during entry, the gastric mucosa is washed with water containing simethicone using biopsy forceps, which is helpful for observation. When the angle is adjusted slightly upwards at the greater curvature of the angle of the stomach and the shaft of the endoscope is rotated in a clockwise direction, the endoscope enters the antrum of the stomach, whereby the pyloric ring can be seen. The antrum of the stomach and the pylorus of the stomach are observed at the bottom, and the angle of the stomach is observed at the central part. When the endoscope enters along the axis of the antrum of the stomach while the angle is carefully adjusted downwards, the endoscope reaches the pyloric ring. When the endoscope enters the stomach via the esophagus, many operators prefer to insert the endoscope up to the duodenum while injecting a minimum amount of air within as short a time as possible and to observe the duodenum and the stomach while pulling back the endoscope. At this time, however, it is necessary to observe the entireties of the duodenum and the stomach well without haste.

A forward-viewing endoscope is inserted while looking directly at the pyloric ring. The endoscope approaches the pyloric ring while observing the antrum of the stomach, and the endoscope is moved in the state in which the pyloric ring is in the center of sight, the endoscope passes over the pyloric ring. If the examinee breathes heavily or the pylorus of the stomach is closed, it is not easy for the endoscope to pass through the pyloric ring. At this time, the examinee temporarily stops breathing or air is inhaled, whereby it is possible for the endoscope to easily pass through the pyloric ring.

At the time of insertion from the duodenal bulb to the second part of the duodenum, it is made sure that the endoscope enters very carefully. The endoscope is carefully advanced while the axis of the endoscope is rotated 90 degrees to the right and at the same time the angle is adjusted upwards. When the endoscope is slowly pulled back in the state in which the angle is fixed without change after insertion, the endoscope that has entered along the greater curvature of the stomach is shortened along the lesser curvature of the stomach, whereby the endoscope is almost straight, and therefore inconvenience of the examinee is reduced.

<Endoscope Observation Tips>

① Basic Principles of Endoscope Observation

A. Observe everything that comes into view.

B. Observe from the front if possible and observe from the side or from all sides as needed.

C. Observe from a distance in order to observe the whole without blind spots and observe closely in order to see in detail.

D. Do not proceed with inspection by force if the examinee is uncooperative or any abnormality is found.

E. Do not proceed with inspection by force if sight is not secured and supply air while pulling back the endoscope again in order to secure sight.

F. Continuously explain the situation using soft language during inspection in order to make observation while reassuring the examinee.

② Setting of Observation Target

Set clear goal before inspection as to which lesion of which part is to be observed according to the purpose of inspection. In general, however, if the purpose is medical examination, evenly observe all parts well.

③ Observation of Blind Spots

Observe parts difficult to observe, such as posterior walls of the cardia of the stomach, the fundus of the stomach, and the body of the stomach, the greater curvature of the upper body of the stomach, directly below the pylorus of the stomach, and a posterior wall of the duodenum, using a U-inversion or J-inversion method or while changing the position of the examinee.

④ Determination of Abnormal Manifestation

Normal manifestation must be completely learned in order to clearly determine whether manifestation is abnormal. Always make a slow inspection without haste, and take various measures if there is any doubt.

⑤ Observation Sequence

In endoscopy, basics of observation of internal organs are to perform observation while inserting the endoscope and to perform observation well again when removing the endoscope. It is necessary for each inspector to set the observation or photographing sequence after insertion of the endoscope such that there is no missing part during observation, although the observation or photographing sequence is changed for each inspector.

⑥ Observation

A. Oral Cavity and Laryngopharynx

The purpose of upper digestive tract endoscopy is to observe the esophagus, the stomach, and the duodenum in detail, and therefore it is good to be devoted only to insertion during insertion and to observe the oral cavity and the laryngopharynx when the endoscope is withdrawn. Since if the endoscope stays too long in the occipital, the examinee may cough and struggle, it is good to perform observation as quickly as possible.

B. Esophagus

The esophagus is observed while air is supplied. Since mucus gathers in most of the esophagus, the esophagus is observed while the esophagus is washed with water and suctioning is performed. When the esophagus is normal, manifestation of blood vessel permeation is shown, and the esophagus is minutely observed in consideration of the fact that various lesions, including early cancer, are present in the esophagus.

A first physiological isthmus is formed at the entrance of the esophagus by cricopharyngeal muscle, and it is good to observe this part while withdrawing the endoscope later, since the endoscope passes over this part simultaneously with deglutition movement. It is good to sufficiently observe the parts other than this part during insertion of the endoscope. Pressure due to the aortic arch and the left main stem bronchus located at the anal side thereof is observed within a width of 2 to 3 cm at the position distant by about 26 to 27 cm from the incisor, which is called a second physiological isthmus, and palpitation of the blood vessel can be confirmed. Pulsatile pressure by the heart may be observed at the part distant by about 35 cm from the incisor, and a third physiological isthmus may be observed at the hiatus part of the diaphragm. Although the esophagus is observed when the endoscope is inserted, manifestation of observation made at the time of insertion is checked again while the endoscope is withdrawn after observation of the duodenum and the stomach (This quotes pages 67 to 69 of *Quality Guidelines of Gastric Cancer Screening* (Second Edition) published by the National Cancer Center/Ministry of Health and Welfare)

The following description will be given with reference back to FIG. 1.

Subsequently, the anatomical location of the stomach is automatically classified and recognized with respect to the image captured during photographing using the plurality of image classification models, the location of a lesion is automatically stored or reported, it is verified whether parts, images of which are recommended to be captured and stored, in gastroscopy have been photographed (step S104).

Figure 5:
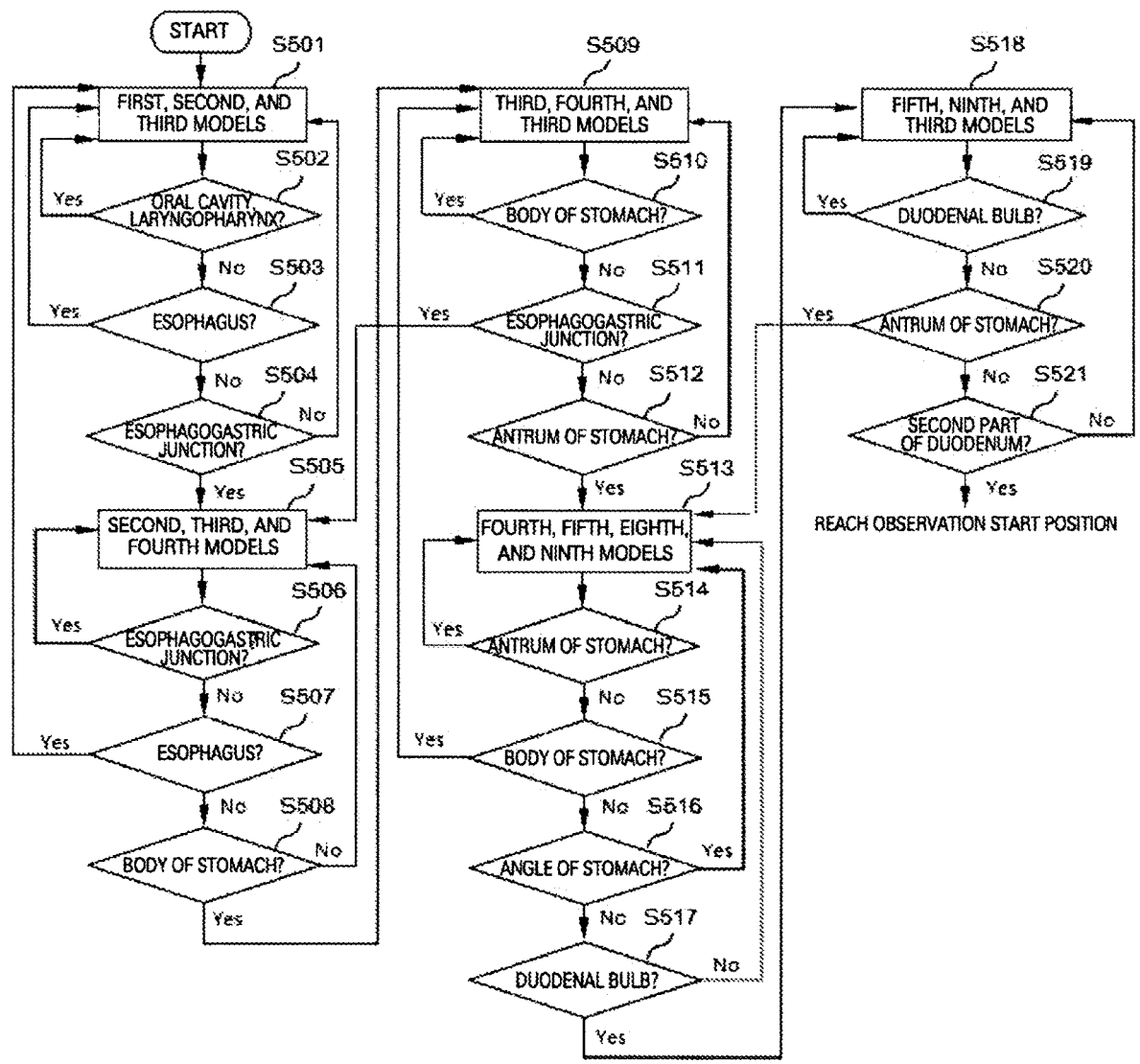
FIG. 5 is a view showing the operation sequence of an artificial intelligence training model for automatic lesion location storage during a photographing process from the oral cavity and the laryngopharynx to a second part of the duodenum using a gastroscopic probe.

Here, when the anatomical location of the stomach is automatically classified and recognized with respect to the image captured during photographing using the plurality of image classification models and the location of the lesion is automatically stored, the oral cavity/the laryngopharynx, the esophagus, and the esophagogastric junction may be classified and recognized using the first, second, and third classification models, the esophagogastric junction, the esophagus, and the body of the stomach may be classified and recognized using the second, third, and fourth classification models, the body of the stomach, the esophagogastric junction, and the antrum of the stomach may be classified and recognized using the third, fourth, and fifth classification models, the antrum of the stomach, the body of the stomach, the angle of the stomach, and the duodenal bulb may be classified and recognized using the fourth, fifth, eighth, and ninth classification models, and the duodenal bulb, the antrum of the stomach, and the second part of the duodenum may be classified and recognized using the fifth, ninth, and tenth classification models in order to automatically store the location of the lesion during the photographing process from the oral cavity and the laryngopharynx to the second part of the duodenum, as shown in FIG. 5.

Figure 6:
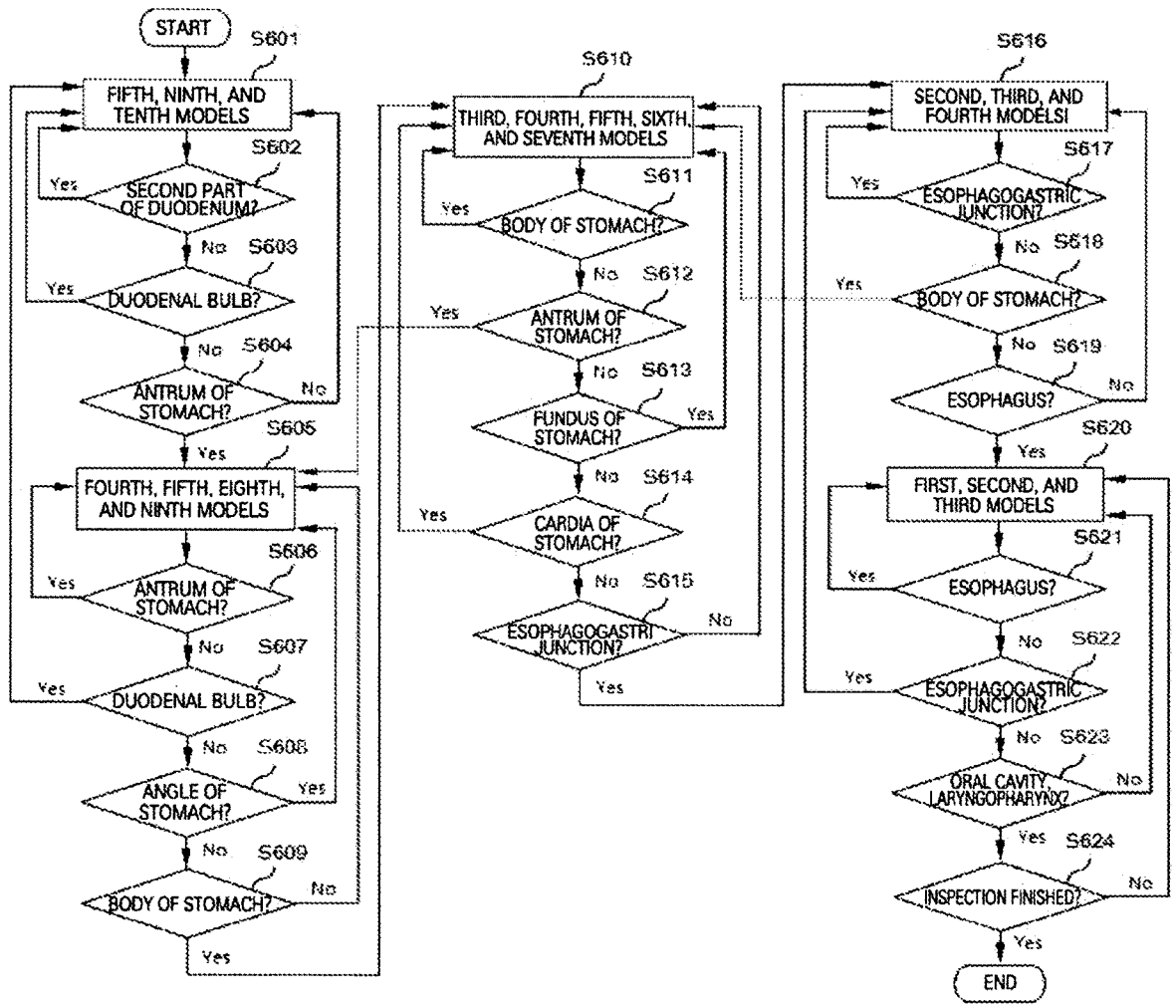
FIG. 6 is a view showing the operation sequence of the artificial intelligence training model for automatic lesion location report during a photographing process from the second part of the duodenum to the oral cavity and the laryngopharynx using the gastroscopic probe.

In addition, when the anatomical location of the stomach is automatically classified and recognized with respect to the image captured during photographing using the plurality of image classification models and the location of the lesion is automatically reported in step S104, the second part of the duodenum, the duodenal bulb, and the antrum of the stomach may be classified and recognized using the fifth, ninth, and tenth classification models, the antrum of the stomach, the duodenal bulb, the angle of the stomach, and the body of the stomach may be classified and recognized using the fourth, fifth, eighth, and ninth classification models, the body of the stomach, the antrum of the stomach, the fundus of the stomach, the cardia of the stomach, and the esophagogastric junction may be classified and recognized using the third, fourth, fifth, sixth, and seventh classification models, the esophagogastric junction, the body of the stomach, and the esophagus may be classified and recognized using the second, third, and fourth classification models, and the esophagus, the esophagogastric junction, and the oral cavity/the laryngopharynx may be classified and recognized using the first, second, and third classification models in order to report the location of the lesion during the photographing process from the second part of the duodenum to the oral cavity and the laryngopharynx, as shown in FIG. 6.

The following description will be given in connection with the automatic lesion location storage during the photographing process from the oral cavity and the laryngopharynx to the second part of the duodenum and automatic lesion location report during the photographing process from the second part of the duodenum to the oral cavity and the laryngopharynx of FIGS. 5 and 6, as described above.

Figure 7:
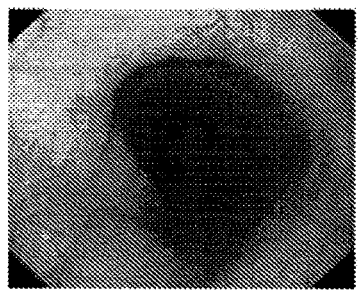
FIG. 7 is a view showing parts, images of which are recommended to be captured and stored, in gastroscopy.
Figure 7:
Figure 7:
Figure 7:
Figure 7:
Figure 7:
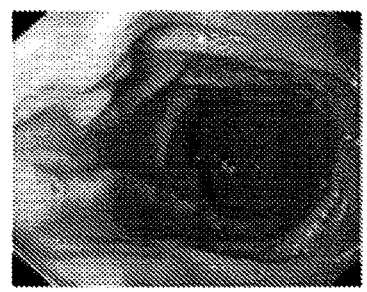
Figure 7:
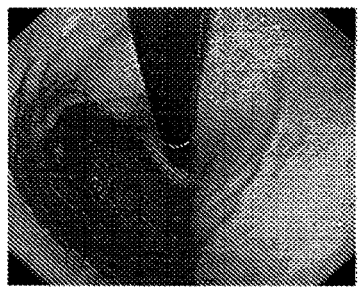
Figure 7:

In addition, parts, images of which are recommended to be captured and stored, in gastroscopy in step S104 may include at least four of eight pictures, i.e. the esophagogastric junction (picture 2), the angle of the stomach (picture 5), the antrum of the stomach (picture 6), and the duodenal bulb (picture 7), as shown in FIG. 7.

In addition, when the anatomical location of the stomach is automatically classified and recognized with respect to the image captured during photographing using the plurality of image classification models and the location of the lesion is automatically stored or reported in step S104, a perforation or a lesion that may become a cause of the perforation in the pylorus of the stomach between the duodenum and the antrum of the stomach may be automatically analyzed and reported.

Figure 8:
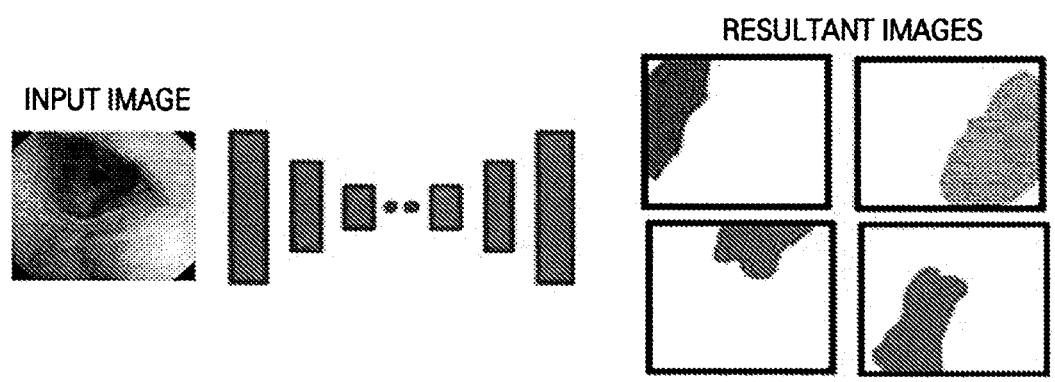
FIG. 8 is a view showing the outline of an input image being segmented by a region segmentation model.
Figure 9A:
FIGS. 9A, 9B and 9C are views respectively showing region segmentation of the body, the antrum, and the fundus of the stomach in a gastroscopic image.
Figure 9A:
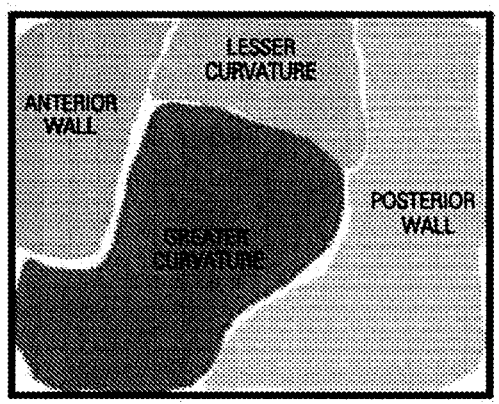
Figure 9B:
Figure 9B:
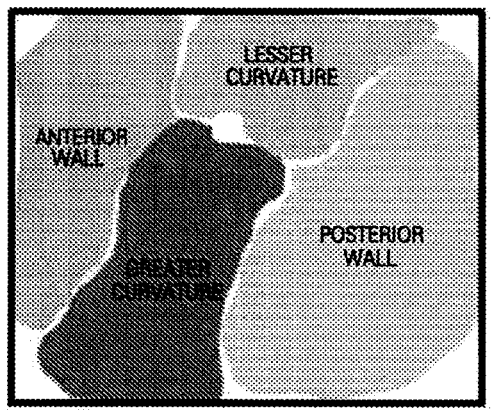
Figure 9C:
Figure 9C:
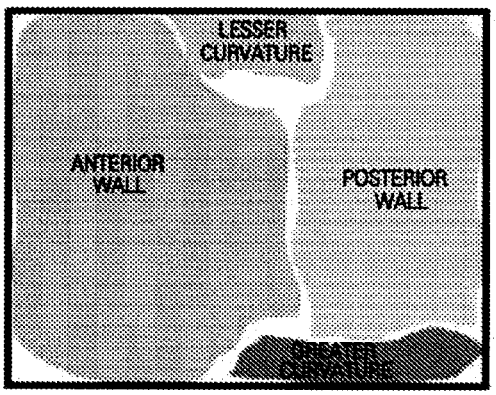

During execution of step S104, an image of a specific part in the captured gastroscopic image is segmented for each region by a region segmentation model and the same number of segmented maps as the number of target classes is output as the result of segmentation (step S105). That is, in the present embodiment, the region segmentation model is trained to segment an input image into a maximum of four regions. As shown in FIG. 8, therefore, the region segmentation model receives a color gastroscopic image as an input image and outputs the same number (4) of segmented maps as the number (4) of the target classes as resultant images. Here, the image of the specific part may include images of the body of the stomach (A), the antrum of the stomach (B), and the fundus of the stomach (C), as shown in FIGS. 9A, 9B, and 9C. At this time, each of the images of the body of the stomach (A), the antrum of the stomach (B), and the fundus of the stomach (C) may be segmented for each region by the region segmentation model, and may include an anterior wall, a posterior wall, a lesser curvature, and a greater curvature as the result of segmentation. For example, when the image of the specific part is the body of the stomach, the region segmentation model may be operated, and the anterior wall, the posterior wall, the lesser curvature, and the greater curvature may be displayed on a screen. When the lesion is recorded, the body of the stomach-the anterior wall or the body of the stomach-the anterior wall and accessory muscle connected to the greater curvature may be displayed.

Meanwhile, FIG. 5 is a view showing the operation sequence of an artificial intelligence training model for automatic lesion location storage during the photographing process from the oral cavity and the laryngopharynx to the second part of the duodenum using the gastroscopic probe.

Referring to FIG. 5, which shows that, in step S104 of FIG. 1, the anatomical location of the stomach is automatically classified and recognized using the plurality of image classification models and the location of the lesion is automatically stored, when a captured image is input, it is recognized whether the part in the input image is the cavity/the laryngopharynx, the esophagus, or the esophagogastric junction using the first, second, and third models (Steps S501 to S504). Upon determining in step S504 that the part is not the esophagogastric junction, the procedure returns to step S501. Upon determining that the part is the esophagogastric junction, it is recognized whether the part is the esophagogastric junction, the esophagus, or the body of the stomach using the second, third, and fourth models (Steps S505 to S508). Upon determining in step S507 that the part is the esophagus, the procedure returns to step S501. At this time, upon determining in step S508 that the part is not the body of the stomach, the procedure returns to step S505. Upon determining that the part is the body of the stomach, it is recognized whether the part is the body of the stomach, the esophagogastric junction, or the antrum of the stomach using the third, fourth, and fifth models (Steps S509 to S512). Upon determining in step S511 that the part is the esophagogastric junction, the procedure returns to step S505. In addition, upon determining in step S512 that the part is not the antrum of the stomach, the procedure returns to step S509, and upon determining that the part is the antrum of the stomach, it is recognized whether the part is the antrum of the stomach, the body of the stomach, the angle of the stomach, or the duodenal bulb using the fourth, fifth, eighth, and ninth models (Steps S513 to S517). Upon determining in step S515 that the part is the body of the stomach, the procedure returns to step S509, and upon determining in step S516 that the part is the angle of the stomach, the procedure returns to step S513. In addition, upon determining in step S517 that the part is not the duodenal bulb, the procedure returns to step S513, and upon determining that the part is the duodenal bulb, it is recognized whether the part is the duodenal bulb, the antrum of the stomach, or the second part of the duodenum using the fifth, ninth, and tenth models (steps S518 to S521). Upon determining in step S520 that the part is the antrum of the stomach, the procedure returns to step S513. In addition, upon determining in step S521 that the part is not the second part of the duodenum, the procedure returns to step S518, and upon determining that the part is the second part of the duodenum, it is recognized that the endoscope has reached the position at which observation is to be commenced.

FIG. 6 is a view showing the operation sequence of the artificial intelligence training model for automatic lesion location report during a photographing process from the second part of the duodenum to the oral cavity and the laryngopharynx using the gastroscopic probe.

Referring to FIG. 6, which shows that, in step S104 of FIG. 1, the anatomical location of the stomach is automatically classified and recognized using the plurality of image classification models and the location of the lesion is automatically reported, when a captured image is input, it is recognized whether the part in the input image is the second part of the duodenum, the duodenal bulb, or the antrum of the stomach using the fifth, ninth, and tenth models (steps S601 to S604). Upon determining in step S604 that the part is not the antrum of the stomach, the procedure returns to step S601, and upon determining that the part is the antrum of the stomach, it is recognized whether the part is the antrum of the stomach, the duodenal bulb, the angle of the stomach, or the body of the stomach using the fourth, fifth, eighth, and ninth models (steps S605 to S609). Upon determining in step S607 that the part is the duodenal bulb, the procedure returns to step S601, and upon determining in step S608 that the part is the angle of the stomach, the procedure returns to step S605. In addition, upon determining in step S609 that the part is not the body of the stomach, the procedure returns to step S605, and upon determining that the part is the body of the stomach, it is recognized whether the part is the body of the stomach, the antrum of the stomach, the fundus of the stomach, the cardia of the stomach, or the esophagogastric junction using the third, fourth, fifth, sixth, and seventh models (steps S610 to S615). Upon determining in step S612 that the part is the antrum of the stomach, the procedure returns to step S605, upon determining in step S613 that the part is the fundus of the stomach, the procedure returns to step S610, and upon determining in step S614 that the part is the cardia of the stomach, the procedure returns to step S610. In addition, upon determining in step S615 that the part is not the esophagogastric junction, the procedure returns to step S610, and upon determining that the part is the esophagogastric junction, it is recognized whether the part is the esophagogastric junction, the body of the stomach, or the esophagus using the second, third, and fourth models (steps S616 to S619). Upon determining in step S618 that the part is the body of the stomach, the procedure returns to step S610. In addition, upon determining in step S619 that the part is not the esophagus, the procedure returns to step S616, and upon determining that the part is the esophagus, it is recognized whether the part is the esophagus, the esophagogastric junction, or the cavity/the laryngopharynx using the first, second, and third models (steps S620 to S623). Upon determining in step S622 that the part is the esophagogastric junction, the procedure returns to step S616, upon determining in step S623 that the part is not the cavity/the laryngopharynx, the procedure returns to step S620, and upon determining that the part is the cavity/the laryngopharynx, it is determined whether inspection has been finished (step S624). Upon determining that inspection has not been finished, the procedure returns to step S620, and upon determining that inspection has been finished, the operation sequence is finished.

In the above series of processes, each of the body of the stomach, the antrum of the stomach, and the fundus of the stomach may be minutely segmented into the anterior wall/the posterior wall and the lesser curvature/the greater curvature in order to display the location of the lesion, through region segmentation, not image classification.

In addition, a dangerous state, such as a perforation, may be automatically found through gastroscopy and the examinee may be informed thereof, whereby it is possible to reduce danger that may occur during the inspection process.

As is apparent from the above description, the artificial intelligence (AI)-based gastroscopic image analysis method according to the present invention has an advantage in that a gastroscopic image is input to the artificial intelligence (AI) training model and is analyzed by the artificial intelligence training model, whereby it is possible to automatically recognize the anatomical location of a stomach in gastroscopy that is performed and to record and report the location of a lesion with respect to a target part and a part adjacent thereto.

In addition, the artificial intelligence-based gastroscopic image analysis method according to the present invention has an advantage in that an inspector having little experience in gastroscopy is reported in advance of a situation that may be dangerous, whereby it is possible to secure safety of inspection.

Although the present invention has been described in detail based on the preferred embodiment, those skilled in the art will appreciate that the present invention is not limited thereto and that various modifications, additions, and substitutions are possible without departing from the scope and spirit of the invention as disclosed in the accompanying claims. Consequently, the true technical protection scope of the present invention should be interpreted by the following claims, and all technical concepts included in a range equivalent thereto should be interpreted as falling within the scope of right of the present invention.

The invention claimed is:

1. An artificial intelligence (AI)-based gastroscopic image analysis method, wherein a captured gastroscopic image is input to a computer and the gastroscopic image is analyzed by an artificial intelligence training model installed in the computer, the artificial intelligence (AI)-based gastroscopic image analysis method comprising:
   a) configuring a plurality of artificial intelligence-based image classification models for the captured gastroscopic image;
   b) configuring training data for each of the plurality of image classification models and training the plurality of image classification models;
   c) observing or photographing respective parts of a stomach from an oral cavity and a laryngopharynx to a second part of a duodenum or from the second part of the duodenum to the oral cavity and the laryngopharynx using a gastroscopic probe;
   d) automatically classifying and recognizing an anatomical location of the stomach with respect to an image captured during photographing using the plurality of image classification models, automatically storing or reporting the location of a lesion, and verifying whether parts, images of which are recommended to be captured and stored, in gastroscopy have been photographed; and
   e) segmenting an image of a specific part in the captured gastroscopic image for each region by a region segmentation model and outputting the same number of segmented maps as the number of target classes as a result of segmentation, wherein
   when the plurality of image classification models is configured in step a), the image classification models are configured so as to be classified into parts adjacent to target parts, and the image classification models are configured so as to be classified into a first classification model to a tenth classification model,
   the image of the specific part comprises images of a body of the stomach, an antrum of the stomach, and a fundus of the stomach in step e), and
   each of the images of the body of the stomach, the antrum of the stomach, and the fundus of the stomach is segmented for each region by the region segmentation model and comprises an anterior wall, a posterior wall, a lesser curvature, and a greater curvature as a result of segmentation.

2. The artificial intelligence (AI)-based gastroscopic image analysis method according to claim 1, wherein
   the training data are configured for each of the plurality of image classification models in step b), and
   the training data are configured so as to be classified into parts adjacent to each of the target parts in the captured gastroscopic image.

3. The artificial intelligence (AI)-based gastroscopic image analysis method according to claim 1, wherein
   the first classification model is configured such that the target part is the oral cavity/the laryngopharynx and parts adjacent thereto are an esophagus and an esophagogastric junction, and
   the second classification model is configured such that the target part is the esophagus and parts adjacent thereto are the oral cavity and the esophagogastric junction.

4. The artificial intelligence (AI)-based gastroscopic image analysis method according to claim 3, wherein
   the third classification model is configured such that the target part is the esophagogastric junction and parts adjacent thereto are the esophagus and the body of the stomach, and
   the fourth classification model is configured such that the target part is the body of the stomach and parts adjacent thereto are a cardia of the stomach, the fundus of the stomach, and the antrum of the stomach.

5. The artificial intelligence (AI)-based gastroscopic image analysis method according to claim 4, wherein
   the fifth classification model is configured such that the target part is the antrum of the stomach and parts adjacent thereto are the cardia of the stomach, the fundus of the stomach, and the body of the stomach, and
   the sixth classification model is configured such that the target part is the fundus of the stomach and parts adjacent thereto are the cardia of the stomach, the body of the stomach, and the antrum of the stomach.

6. The artificial intelligence (AI)-based gastroscopic image analysis method according to claim 5, wherein
   the seventh classification model is configured such that the target part is the cardia of the stomach and parts adjacent thereto are the fundus of the stomach, the body of the stomach, and the antrum of the stomach, and
   the eighth classification model is configured such that the target part is an angle of the stomach and parts adjacent thereto are the cardia of the stomach, the fundus of the stomach, the body of the stomach, and the antrum of the stomach.

7. The artificial intelligence (AI)-based gastroscopic image analysis method according to claim 6, wherein
the ninth classification model is configured such that the target part is a duodenal bulb and parts adjacent thereto are the second part of the duodenum and the antrum of the stomach, and
the tenth classification model is configured such that the target part is the second part of the duodenum and parts adjacent thereto are the duodenal bulb and the antrum of the stomach.

8. The artificial intelligence (AI)-based gastroscopic image analysis method according to claim 7, wherein, when the anatomical location of the stomach is automatically classified and recognized with respect to the image captured during photographing using the plurality of image classification models and the location of the lesion is automatically stored in step d), the oral cavity/the laryngopharynx, the esophagus, and the esophagogastric junction are classified and recognized using the first, second, and third classification models, the esophagogastric junction, the esophagus, and the body of the stomach are classified and recognized using the second, third, and fourth classification models, the body of the stomach, the esophagogastric junction, and the antrum of the stomach are classified and recognized using the third, fourth, and fifth classification models, the antrum of the stomach, the body of the stomach, the angle of the stomach, and the duodenal bulb are classified and recognized using the fourth, fifth, eighth, and ninth classification models, and the duodenal bulb, the antrum of the stomach, and the second part of the duodenum are classified and recognized using the fifth, ninth, and tenth classification models in order to automatically store the location of the lesion during the photographing process from the oral cavity and the laryngopharynx to the second part of the duodenum.

9. The artificial intelligence (AI)-based gastroscopic image analysis method according to claim 7, wherein, when the anatomical location of the stomach is automatically classified and recognized with respect to the image captured during photographing using the plurality of image classification models and the location of the lesion is automatically reported in step d), the second part of the duodenum, the duodenal bulb, and the antrum of the stomach are classified and recognized using the fifth, ninth, and tenth classification models, the antrum of the stomach, the duodenal bulb, the angle of the stomach, and the body of the stomach are classified and recognized using the fourth, fifth, eighth, and ninth classification models, the body of the stomach, the antrum of the stomach, the fundus of the stomach, the cardia of the stomach, and the esophagogastric junction are classified and recognized using the third, fourth, fifth, sixth, and seventh classification models, the esophagogastric junction, the body of the stomach, and the esophagus are classified and recognized using the second, third, and fourth classification models, and the esophagus, the esophagogastric junction, and the oral cavity/the laryngopharynx are classified and recognized using the first, second, and third classification models in order to report the location of the lesion during the photographing process from the second part of the duodenum to the oral cavity and the laryngopharynx.

10. The artificial intelligence (AI)-based gastroscopic image analysis method according to claim 1, wherein, when the respective parts of the stomach from the second part of the duodenum to the oral cavity and the laryngopharynx are photographed in step c), photographing is performed in a sequence of the second part of the duodenum→a duodenal bulb→a pyloric ring→the antrum of the stomach→an angle of the stomach→the body of the stomach→the fundus of the stomach→a cardia of the stomach→the esophagus→the oral cavity and the laryngopharynx.

11. The artificial intelligence (AI)-based gastroscopic image analysis method according to claim 1, wherein the parts, images of which are recommended to be captured and stored, in gastroscopy in step d) comprise an esophagogastric junction, an angle of the stomach, the antrum of the stomach, and a duodenal bulb.

12. The artificial intelligence (AI)-based gastroscopic image analysis method according to claim 1, wherein, when the anatomical location of the stomach is automatically classified and recognized with respect to the image captured during photographing using the plurality of image classification models and the location of the lesion is automatically stored or reported in step d), a perforation or a lesion becoming a cause of the perforation in a pylorus of the stomach between the duodenum and the antrum of the stomach is automatically analyzed and reported.

* * * * *